United States Patent Office 3,674,386
Patented July 4, 1972

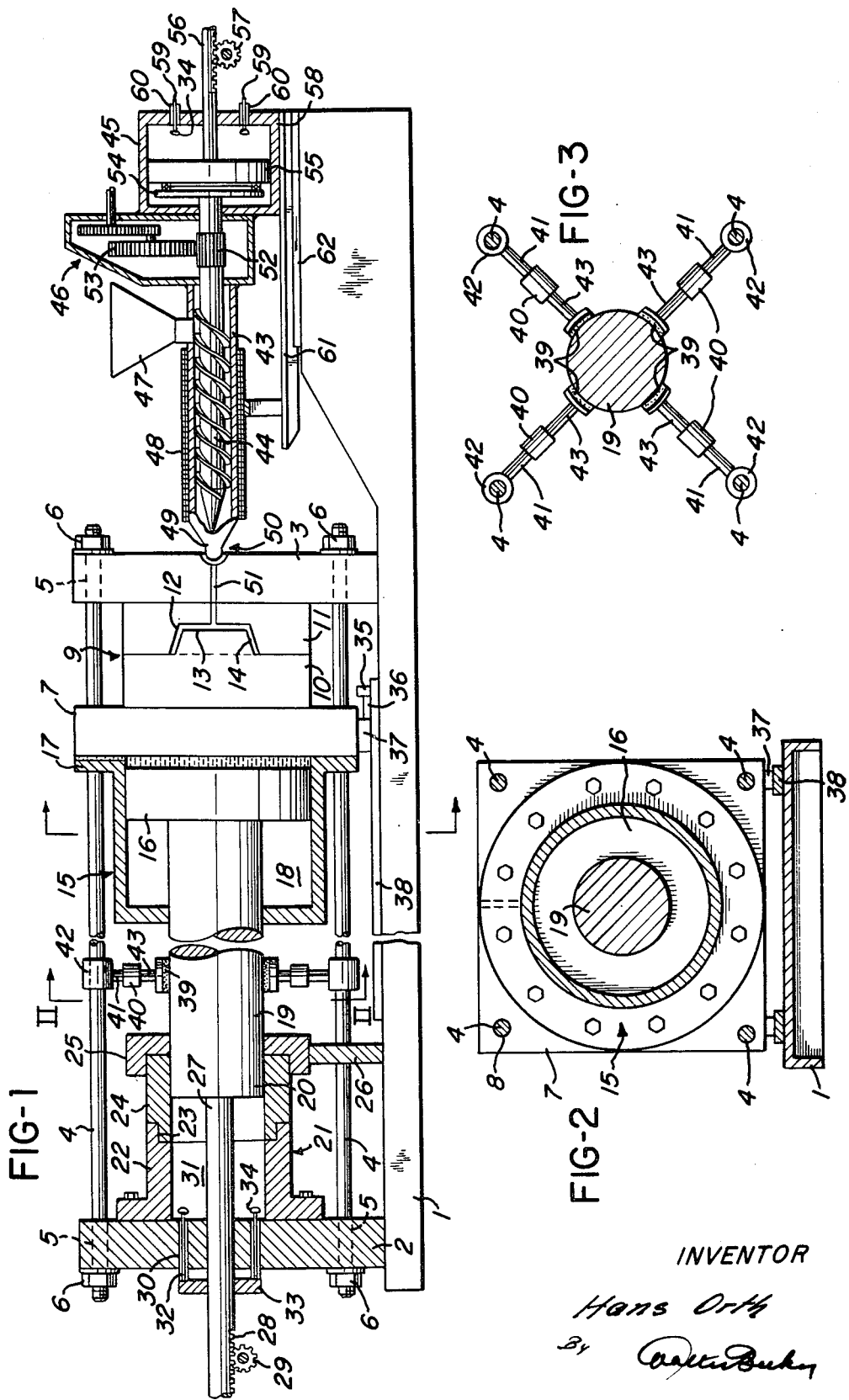

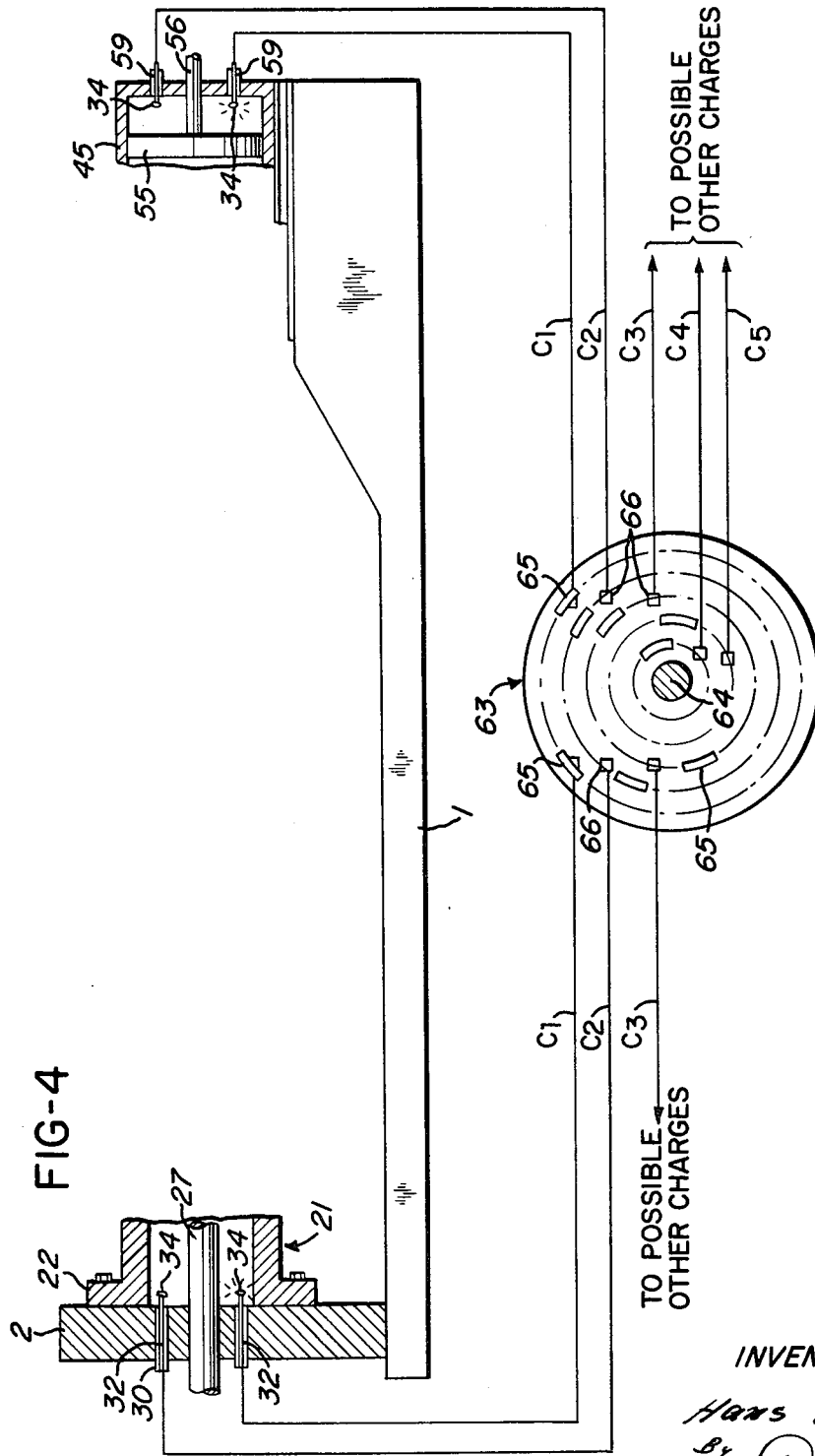

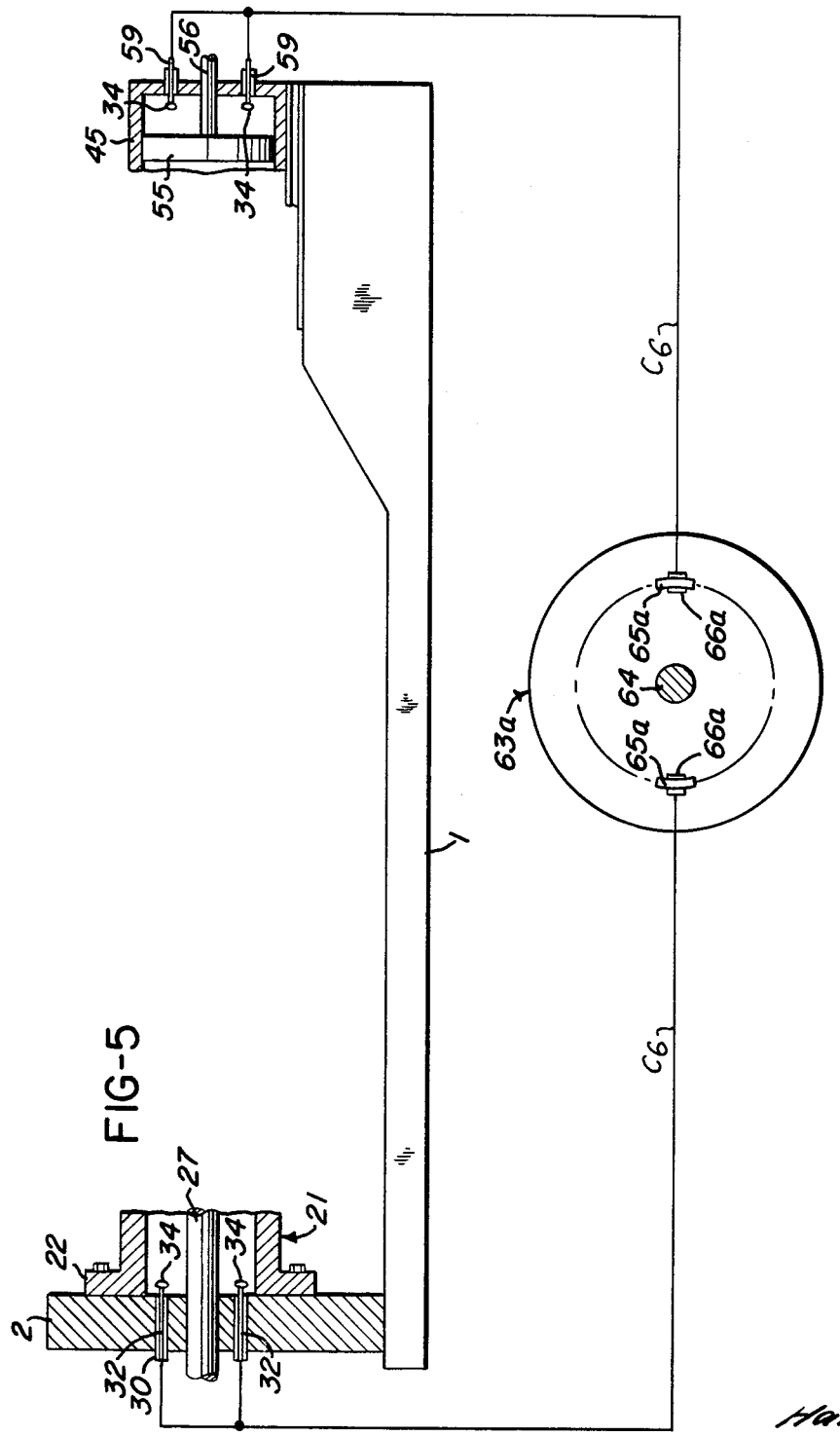

3,674,386
INJECTION MOLDING MACHINE FOR PROCESSING THERMOPLASTIC SYNTHETIC MATERIAL HAVING EXPLOSIVE CHARGING AND CLAMPING UNITS
Hans Orth, Washingtonstrasse 14, Munich 19, Germany
Filed Jan. 29, 1971, Ser. No. 111,006
Int. Cl. B29f 1/06
U.S. Cl. 425—1
14 Claims

ABSTRACT OF THE DISCLOSURE

The specification discloses an injection molding machine having an injection unit and a mold closing and clamping unit, each of which has an actuating piston reciprocable in a respective cylinder. The cylinders are arranged for receiving explosive charges which can be ignited or detonated to actuate the mechanism connected thereto. Control of the detonation of the explosive charges is coordinated with the operation of the injection machine.

The present invention relates to an injection molding machine for processing thermoplastic masses, especially synthetic material, said machine comprising a stationary and an axially movable mold carrying plate. The movable mold carrying plate has mounted thereon a closing unit comprising a cylinder piston system adapted to close a mold range between said plates. By means of said closing unit, the movable carrying plate is moved and at a high pressure is pressed against the stationary mold carrying plate. The machine furthermore comprises an injection unit arranged adjacent the stationary mold carrying plate. This injection unit comprises a cylinder and an axially displaceable pressure medium, the displacement of said pressure medium being effected by means of a piston of a pressure fluid cylinder piston system.

With injection molding machines, it is known to generate the pressures for holding the mold closed and to inject the respective mass into the mold by hydraulic or mechanical means and to employ piston-cylinder systems or elbow levers for this purpose.

With a heretofore known hydraulically operable injection molding machine of the type involved, the movable mold carrying plate is connected to a hydraulic cylinder piston system with an axially displaceable piston movable in the cylinder. The piston rod of this piston is in this instance designed as a hollow cylinder, in which a further piston is axially displaceable for displacing the movable mold carrying plate. The pistons are in conformity with the working cycle of the machine respectively fluid medium actuated, the fluid medium being delivered by a low pressure and a high pressure pump. These pumps are adapted independently of each other to bring about the closing of the mold and to hold said mold in closed position. While by means of these known hydraulic devices relatively high pressures can be generated, these pressures frequently are insufficient to eject large volume articles such as tanks, tubs, furniture, automobile body parts, etc. so that this machine cannot be used for the injection molding of such articles. A further drawback of this known injection molding machine is seen in the fact that for purposes of moving the mold carrying plate and holding the mold closed, considerable quantities of oil have to be moved which requires time. The said heretofore known device also has the drawback that rather expensive units have to be employed for building up the pressure and that such units have to be serviced relatively frequently, whereby the cost per piece of each manufactured article is considerably increased. Finally, the mounting of such large oil containers and the assembly of auxiliary units pertaining thereto frequently causes difficulties so that the assembly of these elements frequently has to be effected outside the machine foundation.

It is, therefore, an object of the present invention to improve the above mentioned heretofore known injection molding machine so as to enable the same without difficulties to injection mold large volume articles, preferably in one shot without having too narrow limits with regard to the quantity of material to be injected.

These objects and other objects and advantages of the invention will appear more clearly from the following specification in connection with the accompanying drawing in which:

FIG. 1 is a cylindrical longitudinal section through an injection molding machine according to the invention.

FIG. 2 is a cross section taken along the line II—II of FIG. 1.

FIG. 3 is a view of a locking device as seen along the line III—III of FIG. 1.

FIG. 4 diagrammatically illustrates an arrangement for the stepwise build-up of the pressure in the cylinders of the injection molding machine.

FIG. 5 is a diagrammatic illustration similar to that of FIG. 4, but for simultaneously igniting the explosive charges of both cylinders of the injection molding machine of FIG. 1.

The injection molding machine according to the present invention is characterized primarily in that the mold is held closed and/or the moving of the movable mold carrying plate and/or the injection of the mass into the mold is effected by explosion pressure. Referring now to the drawings in detail, an injection molding machine according to the invention for processing thermoplastic masses, especially synthetic material, comprises a machine foundation 1 having connected thereto two plates preferably of a table shape. One of these plates, the so-called supporting plate 2 is connected to one end of the machine foundation 1 while the other plate which forms the stationary mold carrying plate 3 is within the region of the cylinder portion of the machine foundation 1 fixedly connected thereto. The supporting plate 2 and the mold carrying plate 3 are interconnected by four spars 4, said spars extending through bores 5 at the corners of said plate 2 and being connected thereto. Adjacent the stationary mold carrying plate 3 there is provided a movable mold carrying plate 7 which likewise has bores 8 in the corner regions thereof through which spars extend. Between the movable and the stationary mold carrying plates 7, 3 there is provided a mold body 9 which is divided. The mold sections 10, 11 of said mold body 9 are respectively screwed to the movable mold carrying plate 7 and stationary mold carrying plate 3. The two mold sections 10, 11 are according to this specific embodiment designed as female and male die members while a cavity 14 therebetween corresponds to the configuration of the article to be injection molded. Connected to the movable mold carrying plate 7 is a cylinder 15 having a piston 16 axially displaceably arranged therein. The upper marginal area of the cylinder 15 is provided with the radial bore 17 which leads from the outside into a cylinder chamber 18 and which forms a passage for a fluid medium to be introduced into cylinder 15. This medium which is introduced between the movable mold carrying plate 7 and the piston 16 forms a pressure cushion by means of which a uniform distribution of the pressure upon the mold carrying plate 7 is assured. The said medium is withdrawn from a vessel not illustrated in the drawing, which communicates with the radial bore 17 through a conduit. This conduit is equipped with a check valve likewise not illustrated in the drawing, through which the medium flow is released in one direction only, namely from the vessel to the radial bore 17 but is blocked in the reverse direction by the valve so that the pressure cushion will when being subjected to pressure serve as an incompressible supporting surface. The piston 16 of the piston unit is followed by a piston rod-plunger 19 which extends from the cylinder 15 while that end thereof which forms the second piston 20 emerges into a pressure cylinder 21. The pressure cylinder 21 is arranged in axially spaced relationship to the cylinder 15 and extends around a portion of the piston unit while at one end being connected to the supporting plate 2. Cylinder 21 may additionally be subdivided in transverse direction in which instance its ends 22, 23 may overlap within the region of this transverse division and may each be provided with a thread. By means of this transverse division of the pressure cylinder 21, a change in the length of this cylinder is maintained so that the cylinder can be adapted to the respective desired stock of the injection molding machine. The protruding end 24 of the pressure cylinder 21 is likewise provided with a thread meshing with the thread of an annular body 25 extending around the piston rod 19. By means of this annular body 25, a radial pressure generated expansion of the free ends of the pressure cylinder 21 will be prevented so that the piston 20 guided in this cylinder will snugly in a pressure tight manner engage the walls of the pressure cylinder 21. Furthermore, the annular body 25 has that mantle surface thereof which faces the piston rod provided with a seal by means of which the pressure cylinder 21 is hermetically closed. The annular body 25 is furthermore connected to a suport 26 which is axially displaceable and connectable on the machine foundation 1. Connected to the piston 20 is a further piston rod 27 of a smaller diameter, which piston rod 27 is passed outwardly through the supporting plate 2 in a pressure tight manner. Outside the pressure cylinder 21 or supporting plate 2, the piston rod 27 preferably forms a gear rack 28 meshing with a pinion 29 of a driving device not shown. If desired, said pinion 29 may resiliently mesh with said rack 28. By means of this driving device, the entire piston unit comprising piston 16, piston rod 19, piston 20 and piston rod 27 is axially displaced, and the mold carrying plate 7 adjacent to said unit is moved during the opening and closing cycle of the injection molding machine. Tubular bodies 30 are passed through the supporting plate 2. These tubular bodies 30 lead into a chamber 31 of the pressure cylinder 21 and serve for guiding one supporting bar 32 each. The supporting bars 32 of which preferably at least two extend into the chamber 31 are mounted on an annular body 33 in a protruding manner, said annular body 33 interconnecting said bars. Furthermore, the supporting bars 32 have their free ends provided with holding means serving for receiving an explosive substance 34 to be introduced into pressure cylinder 21. The annular body 33 and the supporting rods 32 are made of an electrically conductive material and are provided with an insulating cover. Furthermore, the supporting bars 32 are plugged into the tubular body 30 so as to be introduced and withdrawn thereby in a pressure tight manner. The annular body 33 is through a conductor (not shown in the FIG. 1) connected to an electric pulse emitter. It is by a current pulse of said pulse emitter that the explosive substance 34 is ignited. The pulse emitter is through conductors connected to a contact emitter 35 which latter is clamped fast to the end of a rail 38. The contact emitter 35 is actuated by a contact finger 36 which is mounted on a slide shoe 37 connected to the movable mold carrying plate 7. In order to keep the mold body 9 also closed while the pressure in the pressure cylinder 21 decreases, a locking device is provided about the piston rod 19 which locking device comprises a brake lining 39 and a cylinder piston arrangement 40 which presses said brake lining against the piston rod 19. The cylinder of this arrangement 40 is through a supporting member 41 connected to a sleeve 42 which is keyed to the spar 4. A further supporting member 43 is formed by the piston rod of the piston cylinder arrangement 40 the free end of which acts upon a supporting plate which is connected to the brake lining 39. The cylinders of this locking device 39–43 are connected for instance to a pressure oil pump which in its turn is connected to a switch cabinet controlling the working cycle of the injection molding machine. The above mentioned structural elements form the closing unit of the injection molding machine which has opposite thereto, i.e. at the other end of the machine foundation 1 located an injection molding unit which in this specific example is mounted in an elevated manner on the machine foundation 1 so that the longitudinal central axis of said injection molding unit extends along the longitudinal central axis of the closing unit.

The injection unit primarily comprises a cylinder 43 with an axially displaceable pressing element preferably in the form of a worm. This worm is rotatable and axially displaceable in the cylinder and forms a conveying and homogenizing worm 44. Furthermore, the said worm is operatively connected to a transmission unit which is connected to said cylinder 43 and communicates with fluid pressure operable cylinder piston system 45, 55. Within the region of one end of said cylinder 43 there is provided a filling funnel 47 which has associated therewith a dosing device of any standard type, not shown in the drawing.

Furthermore, electric heating means 48 surround the cylinder 43 for accelerating the homogenizing and plasticizing of the mass and by means of which the mass is kept homogeneous over a longer period of time in said cylinder 43. The free end of cylinder 43 is provided with an injection nozzle 49 which contains a torpedo (not shown) in a standard manner. The injection nozzle comprises a closing needle responsive to pressure and adapted after effected injection to shear off the strand of the mass and to close the injection nozzle 49. For the injection nozzle 49 there is provided a depression 50 in the stationary mold supporting plate 3, into which depression a bore 51 leads which extends to the bottom of the die 12 and serves for feeding the mass into the mold cavity 14. The conveyor worm 44, which is floatingly mounted in the cylinder 43, has a part of that portion thereof which extends through the transmission box of the transmission unit 46 designed as a gear 52 which meshes with the gear 53 of the transmission unit 46. Furthermore, that end of the conveyor worm 44 which extends into the pressure cylinder 45 is provided with a disc 54 which is rotatably mounted on the piston 55 reciprocably mounted in the pressure cylinder 45. Piston 55 has connected thereto a piston rod 56 which, similar to the piston rod 27 of the closing unit, forms a rack meshing with a pinion 57 of a driving device, not shown in the drawing. Guiding pipes 60, preferably two guiding pipes pass through the rear wall 58 into the pressure cylinder 45 and serve for guiding supporting rods 59. The supporting rods 59 correspond as far as construction and effect is concerned to the supporting rods 32 of the closing unit and, similar to the latter, are connected to a common annular body. Also, this annular body is connected to the same pulse emitter 35 through conductors, not shown in the drawing. The supporting rods 32, 59, are each actuated by a driving device, not shown in the drawing, which on one hand is mounted on the supporting plate 2 for the supporting rods 32, and on the other hand, on the rear wall 58 for the supporting rods 59. Provided on the bottom of the pressure cylinder 45 is a double rail 61 which is guided in a sliding device 62.

The sliding device 62 is so designed that the latter will make possible, not only an axial displacement of the injection unit, but also a pivoting of this unit in horizontal and/or vertical direction.

Referring now to FIG. 4, this figure shows at its upper part a portion only of FIG. 1, and, more specifically, only a portion of the cylinders 21 and 45 with the tubular members 30 and 60 respectively. In particular, FIG. 4 is intended to illustrate the stepwise pressure build-up in cylinders 21 and 45, while, in this instance, the respective lower explosive charge has exploded, whereas the respective upper explosion charge is shortly to explode. The supply of current to the explosive charges 34 is effected through conductors C1, C2, while additional conductors, e.g. C3, C4, C5 may be provided in case more than two charges should be employed. Through the said conductors the said charges 34 are electrically connected to a contact disc 63 keyed to a rotatable shaft 64. Contact disc 63 is equipped with contact strips 65 which are adapted electrically to be connected to contact brushes 66 or collectors, or the like. The said contact strips are arranged along pitch circles around shaft 64 and are mounted on the contact disc 63 so that they are electrically connectable to a source of current. In conformity with the desired number of charges and the desired ignition sequence, more or less contact strips are provided on disc 63. The distance between respective adjacent contact strips determines the ignition time of the respective charge.

The arrangement of FIG. 5 is similar to that of FIG. 4 and differs therefrom substantially only in that the contact strips 65a are located on the same pitch circle on the contact disc 63a. The charges of both cylinders 21, 45 ignite at the same time. All charges of one and the same cylinder are in this instance interconnected, e.g. by the annular body 33 above referred to.

The operation of the injection machine is as follows: By means of the pinion 29, the piston unit 16, 19, 20 and 27, is axially displaced against the stationary mold carrying plate 3 whereby the mold sections 10 and 11 of the mold body 9 are closed. Simultaneously, the injection unit is moved against the stationary mold supporting plate 3, and the injection nozzle 49 is pressed against the depression 50 in such a way that the closing needle frees the nozzle opening 49. In view of the closing of the mold body 9, the contact emitter 35 is simultaneously actuated by the contact finger 36 whereby the circuit to the impulse emitter is closed. Subsequently thereto, the impulse emitter emits an ignition pulse to one or both explosive means 34 which is or are exploded. In view of this explosion of the explosion means in their respective pressure cylinders 21, 45, the pistons 20, 55, associated with these cylinders are moved at high pressure and depending on the piston function, the movable mold supporting plate 7 is pressed over the liquid cushion and the mass is pressed into the mold. The pressures in these cylinders 21, 45, are build up stepwise in conformity with a preselected rated value. However, it is also possible to effect the movement of the pistons 20, 55, in the manner of a shock wave. The pressures in pressure cylinders 21, 45, are maintained for a short period of time over the holding or injection process and, more specifically, until the injection article has sufficiently solidified. In order, during the closing of the mold, to prevent a rebounding, especially of the mold carrier plate 7, and thereby a corresponding drop in pressure in the mold body 9, the piston rod 19 is non-movably arrested and held by a locking device 39–43. After the injected article has solidified, the mold body 9 is opened and the article is removed from the mold body by a standard ejector, not shown in the drawing. While the mold sections 10 and 11 are being opened, it is also possible, if this should be advantageous, to withdraw the injection unit from the stationary mold carrier plate while previously the strand of the mass has been sheared off by the closing needle in the injection nozzle 49. Simultaneously, also the conveyor worm 44 is withdrawn so that new material to be injected passes from the filling funnel 47 into the cylinder 43. The subsequent operations occur in a manner analogous to the described injection operation.

As will be seen from the above, by keeping the mold closed or/and moving the movable mold carrier plate and by injecting the mass into the mold by explosion pressure in conformity with the present invention, it is possible to produce articles having a large volume, for instance, in one shot, inasmuch as the necessary pressure for the injection of the mass into the mold and/or keeping the mold closed can easily be adapted to the size of the respective article to be injected.

A further advantage of the invention consists in that in view of the structural simplicity of the closed and/or injection unit, especially in view of the simplification of the pressure creating units, the manufacturing costs of the injection machine will be considerably reduced and also the servicing of the pertaining auxiliary devices will be reduced to a minimum. Furthermore, the machine according to the invention makes possible to obtain a high output, inasmuch as due to the employment of mechanical feeding devices for the moving of the movable mold supporting plate, short closing and opening periods can be realized.

It is, of course, to be understood that the present is, by no means, limited to the specific embodiments shown in the drawing, thus, it is possible, for instance, to provide the mold body 9 with a plurality of injection units or to supply the cylinder 43 with plasticized material to be injected from additional cyinders communicating with cylinder 43. It is also within the ambit of the present invention, instead of providing the conveying and homogenizing worm 44 to employ a pressure piston and to operatively connect the same through a piston rod to piston 55 in pressure cylinder 45. It is furthermore possible to arrange the injection casting machine, for instance, the closing unit thereof, in a vertical manner and to charge the molding body 9 or mold cavity 14 by means of one or more injection units arranged horizontally with regard thereto.

If, instead of solid explosive substances, also liquid or pulverous explosion material is available, it is possible to employ the same correspondingly for building up the pressure in the closing end or injection unit. Liquid explosion substances have the advantage that they burn with less residue so that the machine or pressure cylinder thereof have to be cleaned only after many working cycles have been completed.

What is claimed is:

1. In an injection molding machine: a frame, stationary and movable mold supporting plates in said frame, actuating means for moving the movable plate toward said stationary plate and including a first piston connected to said movable plate and a first cylinder on the frame into which the piston extends, an injection unit in said frame including a molding material displacing element operable when actuated to inject molding material into a mold mounted on said plates, actuating means for said injection unit including a second piston connected to the molding material displacing element and a second cylinder on said frame into which said piston extends, explosive charge means in at least one of said cylinders operable when detonated to develop pressure therein acting on the said piston therein, and means for detonating said explosive charge means during a molding cycle.

2. An injection molding machine according to claim 1 in which said explosive charge means comprises explosive charges in both of said cylinders.

3. An injection molding machine according to claim 1 in which the cylinder having the explosive charge therein includes at least one bore in an end wall thereof, and an explosive charge supporting rod introduceable into the cylinder via said bore.

4. An injection molding machine according to claim 3 which includes means extending through said rod for igniting the charge thereon.

5. An injection molding machine according to claim 1 in which said means for detonating said explosive charge means is operated in conformity with the control cycle of said machine.

6. An injection molding machine according to claim 1 in which said explosive charge means provides for stepwise build up of pressure in the respective cylinder.

7. An injection molding machine according to claim 1 in which the pressure developed by detonation of said explosive charge means is maintained until the injected molding material has solidified.

8. An injection molding machine according to claim 1 in which said means for moving said movable plate comprises a third piston and cylinder coaxial with said first piston and cylinder, said third cylinder being connected to said movable plate and said third piston being connected in tandem with said first piston.

9. An injection molding machine according to claim 1 in which said first piston has a reduced diameter portion extending out the end of said first cylinder which is remote from said movable plate, said reduced diameter portion comprising rack means, and a pinion rotatable on said frame and meshing with said rack means.

10. An injection molding machine according to claim 9 in which said pinion meshes resiliently with said rack means.

11. An injection molding machine according to claim 1 in which said first cylinder comprises a pair of axial parts, said parts telescopically engaging one another at the juncture thereof.

12. An injection molding machine according to claim 1 which includes a locking device carried by said frame and engageable with said first piston and operable to lock said first piston against axial movement in said frame.

13. An injection molding machine according to claim 12 in which said locking device comprises shoe elements having friction elements thereon engageable with said first piston, and piston and cylinder means connected between said frame and said shoe elements for actuating said elements.

14. An injection molding machine according to claim 1 in which said injection unit comprises an injection cylinder, said molding material displacing element comprising a conveying and homogenizing worm rotatably and reciprocably mounted in said injection cylinder.

References Cited

UNITED STATES PATENTS

| | | | |
|---|---|---|---|
| 3,004,290 | 10/1961 | Toulmin, Jr. | 18—Dig. 15 |
| 2,648,125 | 10/1953 | McKenna et al. | 18—Dig. 15 |
| 1,372,843 | 3/1921 | Talla | 164—119 X |

J. SPENCER OVERHOLSER, Primary Examiner

D. S. SAFRAN, Assistant Examiner

U.S. Cl. X.R.

425—Dig. 15, Dig. 26, 245, 214, 208; 264—328